US009342373B2

(12) United States Patent
Hansson et al.

(10) Patent No.: US 9,342,373 B2
(45) Date of Patent: May 17, 2016

(54) VIRTUAL MACHINE MANAGEMENT AMONG NETWORKED SERVERS

(75) Inventors: Nils P. Hansson, Kirkland, WA (US);
Bruce A. Smith, Austin, TX (US);
Edward S. Suffern, Durham, NC (US);
James L. Wooldridge, Kirkland, WA (US)

(73) Assignee: International Business Machines Corporation, Armonk, NY (US)

( * ) Notice: Subject to any disclaimer, the term of this patent is extended or adjusted under 35 U.S.C. 154(b) by 869 days.

(21) Appl. No.: 12/783,658

(22) Filed: May 20, 2010

(65) Prior Publication Data

US 2011/0289204 A1    Nov. 24, 2011

(51) Int. Cl.
*G06F 9/50* (2006.01)
*H04L 29/08* (2006.01)

(52) U.S. Cl.
CPC .......... *G06F 9/5088* (2013.01); *G06F 9/5077* (2013.01); *H04L 67/1008* (2013.01); *H04L 67/34* (2013.01)

(58) Field of Classification Search
CPC . G06F 11/1484; G06F 9/5088; G06F 9/5077; H04L 67/1008; H04L 67/34
USPC ........................................................ 709/224
See application file for complete search history.

(56) References Cited

U.S. PATENT DOCUMENTS

| 7,383,405 | B2 | 6/2008 | Vega et al. |
| 7,607,129 | B2 | 10/2009 | Rosu et al. |
| 8,145,760 | B2 * | 3/2012 | Dinda et al. .................. 709/226 |
| 8,296,759 | B1 * | 10/2012 | Hutchins et al. .................. 718/1 |
| 2005/0132362 | A1 | 6/2005 | Knauerhase et al. |
| 2006/0069761 | A1 | 3/2006 | Singh et al. |
| 2006/0195715 | A1 | 8/2006 | Herington |
| 2008/0104608 | A1 | 5/2008 | Hyser et al. |

(Continued)

FOREIGN PATENT DOCUMENTS

| CN | 101593133 A | 12/2009 |
| EP | 1 931 113 A1 | 6/2008 |
| JP | 02009116852 A | 5/2009 |

OTHER PUBLICATIONS

PCT Search Report and Written Opinion, PCT/EP2011/057995, Sep. 29, 2011.

(Continued)

*Primary Examiner* — Viet Vu
*Assistant Examiner* — Herman Belcher
(74) *Attorney, Agent, or Firm* — Edward J. Lenart; Grant A. Johnson; Kennedy Lenart Spraggins LLP

(57) ABSTRACT

Virtual machine management among networked servers coupled for data communications with a data communications network that includes a network device and a Virtual Machine Management Module ('VMMM'), where VM management includes: monitoring, by the network device, network traffic of applications executing in virtual machines of the servers; determining, in dependence upon the monitored network traffic, whether a particular application's network traffic exceeds a predetermined threshold, the particular application executing in a particular virtual machine of a particular server; if the particular application's network traffic exceeds the predetermined threshold, allocating, by the VMMM, an additional virtual machine in a different server; and instantiating, by the VMMM, in the additional virtual machine at least one application.

11 Claims, 9 Drawing Sheets

(56) References Cited

U.S. PATENT DOCUMENTS

| | | | |
|---|---|---|---|
| 2009/0007099 A1 | 1/2009 | Cummings et al. | |
| 2009/0150547 A1* | 6/2009 | Tripathi | 709/226 |
| 2009/0228589 A1 | 9/2009 | Korupolu | |
| 2009/0265707 A1* | 10/2009 | Goodman et al. | 718/1 |
| 2010/0005465 A1 | 1/2010 | Kawato | |
| 2010/0027420 A1* | 2/2010 | Smith | 370/235 |
| 2010/0281482 A1 | 11/2010 | Pike et al. | |
| 2011/0131499 A1* | 6/2011 | Ferris et al. | 715/736 |
| 2011/0231390 A1* | 9/2011 | Inagaki et al. | 707/721 |
| 2011/0239010 A1* | 9/2011 | Jain et al. | 713/310 |
| 2012/0240117 A1 | 9/2012 | Hansson et al. | |

OTHER PUBLICATIONS

Suffern et al., "Dynamically Provisioning Virtual Machines".

Jiao et al., "Utilizing fault containment to construct a survivable network security device kernel", Journal of National University of Defense Technology, vol. 27, No. 6, p. 3.

Zhao et al., "Adaptive Distributed Load Balancing Algorithm Based on Live Migration of Virtual Machines in Cloud", Fifth International Joint Conference on INC, IMS and IDC, 20.

* cited by examiner

VIRTUAL MACHINE MANAGEMENT AMONG NETWORKED SERVERS

BACKGROUND OF THE INVENTION

1. Field of the Invention

The field of the invention is data processing, or, more specifically, methods, apparatus, and products for virtual machine management among networked servers.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Computer systems today are often networked for data communications and often run several operating systems concurrently through the use of virtual machines—software emulating hardware. An application executing in a virtual machine of a server may, from time to time, receive or send so many data communications packets or messages that the application effectively monopolizes bandwidth available to the server upon which the virtual machine and the application are executing. Other applications executing in the same or different virtual machine on the same server may be unable to operate at high efficiency due to a lack of available bandwidth. In addition, in some cases when one application receives a great number of data communications messages, the application itself may be overwhelmed.

SUMMARY OF THE INVENTION

Methods, apparatus, and products for virtual machine management among networked servers are disclosed. In embodiments of the present invention, the servers are coupled for data communications with a data communications network that includes a network device and a Virtual Machine Management Module ('VMMM'). Virtual machine management in accordance with embodiments of the present invention includes monitoring, by the network device, network traffic of applications executing in virtual machines of the servers; determining, in dependence upon the monitored network traffic, whether a particular application's network traffic exceeds a predetermined threshold, the particular application executing in a particular virtual machine of a particular server. If the particular application's network traffic exceeds the predetermined threshold, allocating, by the VMMM, an additional virtual machine in a different server; and instantiating, by the VMMM, in the additional virtual machine at least one application.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
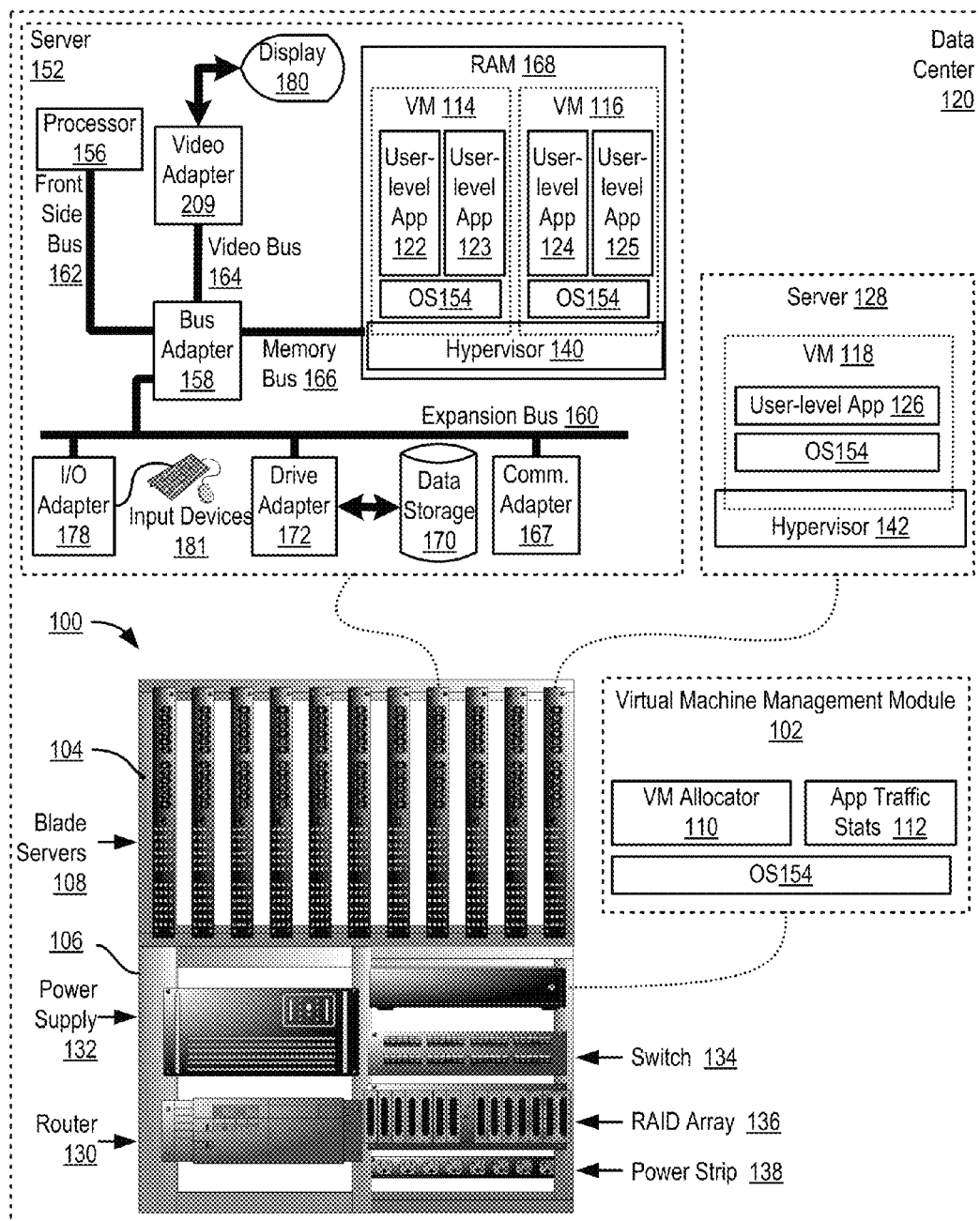
FIG. 1 sets forth a line drawing of an exemplary data center in which virtual machines are managed among networked servers according to embodiments of the present invention.

Exemplary methods, apparatus, and products for virtual machine management among networked servers in accordance with the present invention are described with reference to the accompanying drawings, beginning with FIG. 1. FIG. 1 sets forth a line drawing of an exemplary data center in which virtual machines are managed among networked servers according to embodiments of the present invention. A data center (120) is a facility used to house mission critical computer systems and associated components. Such a data center may include environmental controls (air conditioning, fire suppression, etc.), redundant/backup power supplies, redundant data communications connections, and high security, highlighted by biometric access controls to compartmentalized security zones within the facility. A data center may also house a large amount of electronic equipment, typically computers and communications equipment. A data center may be maintained by an organization for the purpose of handling the data necessary for its operations. A bank, for example, may have a data center, where the bank customers' account information is maintained and transactions involving these accounts are carried out. Practically every company that is mid-sized or larger has some kind of data center with the larger companies often having dozens of data centers.

A virtual machine ('VM') as the term is used in this specification refers to a software implementation of a machine, such as a computer. A virtual machine enables sharing of the underlying physical machine resources between different virtual machines, each of which may run its own operating system. The software layer providing the virtualization is called a virtual machine monitor or hypervisor. A hypervisor is a module of automated computing machinery that performs software and hardware platform-virtualization in order to enable multiple operating systems to run on a host computer concurrently in separate virtual machines. A hypervisor runs directly on the host's hardware to control hardware access and to monitor guest operating-systems. A guest operating system runs on a level above the hypervisor. The platform virtualization provided by a hypervisor is referred to in this specification as a virtualized environment. A virtualized environment is one in which physical characteristics of a computing platform—computer processors, computer memory, I/O adapters, and the like—are abstracted from the perspective of an operating system and other software applications.

VMs provide many benefits including, for example:
multiple OS environments can co-exist on the same physical computer hardware resources, in strong isolation from each other;
an instruction set architecture (ISA) that is somewhat different from that of the ISA of the underlying physical computer hardware resources;
application provisioning, maintenance, high availability and disaster recovery; and
other benefits as will occur to readers of skill in the art.

The example data center (120) in the example of FIG. 1 includes a Blade Center™ (100), a type of server chassis specifically configured to house a number of blade servers. A server, as the term is used in this specification, refers generally to a multi-user computer that provides a service (e.g. database access, file transfer, remote access) or resources (e.g. file space) over a network connection. The term 'server,' as context requires, refers inclusively to the server's computer hardware as well as any server application software or operating system software running on the server. A server application is an application program that accepts connections in order to service requests from users by sending back responses. A server application can run on the same computer as the client application using it, or a server application can accept connections through a computer network. Examples of server applications include file server, database server, backup server, print server, mail server, web server, FTP servers, application servers, VPN servers, DHCP servers, DNS servers, WINS servers, logon servers, security servers, domain controllers, backup domain controllers, proxy servers, firewalls, and so on.

A blade server is a server computer with a modular design optimized to minimize the use of physical space and energy. Whereas a standard rack-mount server can function with at least a power cord and network cable, blade servers have many components removed to save space, minimize power consumption and other considerations, while still having all the functional components to be considered a computer. A blade center, which can hold multiple blade servers, provides services such as power, cooling, networking, various interconnects and management—though different blade providers have differing principles around what to include in the blade itself (and sometimes in the enclosure altogether).

In the example of FIG. 1, the blade center (100) includes two cabinet bays (104, 106), each of which includes several components. Cabinet bay (104) contains a number of blade servers (108), each of which is powered by a power supply (132). Cabinet bay (106) contains the power supply (132) for the blade center (100), a data communications network router (130), a network switch (134), and a virtual machine management module ('VMMM') (102) which is described below in more detail. Cabinet bay (106) also contains a Redundant Array of Independent Disks ('RAID') (136) and a power strip (138).

In FIG. 1, two of the blade servers (108) in the blade center (100) are depicted in an expanded form for clarity of explanation: blade server (152) and blade server (128). Readers of skill in the art will understand, however, that each of the blade servers (108) of the blade center (100) may include similar components to servers (152, 128) and operate in a similar fashion when participating in VM management in accordance with embodiments of the present invention. Consider, as an example of server useful in systems in which VM management is carried out in accordance with embodiments of the present invention, server (152). Server (152) includes at least one computer processor (156) or 'CPU' as well as random access memory (168) ('RAM') which is connected through a high speed memory bus (166) and bus adapter (158) to processor (156) and to other components of the server (152).

Stored in RAM (168) of the server (152) is a hypervisor (140) that enables two virtual machines (114, 116) to run on the server's (152) underlying hardware and utilize the server's (152) hardware resources. Executing within (or said another way, 'running on') virtual machine (114), is an operating system (154) and two user-level applications (122, 123). Operating systems useful in servers that participate in VM management according to embodiments of the present invention include UNIX™, Linux™, Microsoft XP™, AIX™, IBM's i5/OS™, and others as will occur to those of skill in the art. Executing within virtual machine (116) is an operating system (154) and two user-level applications (124, 125). Operating system (154) executing within virtual machine (116) may be a separate instance of the same operating system (154) executing in virtual machine (114), or may be another type of operating system (154) altogether. That is, both operating systems in server (152) may be the same—such as Unix™—or both operating systems may be different—such as Unix™ and Microsoft XP™.

The hypervisor (140), operating systems (154), and user-level applications (122-125) in the example of FIG. 1 are shown in RAM (168), but many components of such software typically are stored in non-volatile memory also, such as, for example, on a disk drive (170).

The server (152) of FIG. 1 includes disk drive adapter (172) coupled through expansion bus (160) and bus adapter (158) to processor (156) and other components of the server (152). Disk drive adapter (172) connects non-volatile data storage to the server (152) in the form of disk drive (170). Disk drive adapters useful in servers that participate in virtual machine management among networked servers according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example server (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example server (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary server (152) of FIG. 1 includes a communications adapter (167) for data communications with other computers and for data communications with a data communications network (not shown in FIG. 1). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in servers that participate in VM management according to embodiments of the present invention include modems for wired dial-up communications, Ethernet (IEEE 802.3) adapters for wired data communications network communications, and 802.11 adapters for wireless data communications network communications.

Although only server (152) is depicted as including a processor (156), RAM (168), bus adapter (158), communications adapter (167) and the like, readers of skill in the art will recognize that any of the blade servers (108) in the example of FIG. 1 and, more specifically, server (128), may also include similar components. In the example of FIG. 1, server (128) is depicted as executing a hypervisor (142) that supports a virtual machine (118) within which an operating system (154) and a user-level application (126) are executing.

The switch (134) of the blade center (100) of FIG. 1 is an example of a network device, a unit that mediates data in a computer network. Networking devices may also be referred to as network equipment, Intermediate Systems (IS) or Inter-Working Units (IWUs). Units which are the last receiver or generate data are called hosts or data terminal equipment.

Examples of networking devices include:
Gateway: a device at a network node that interfaces with another network that uses different protocols. Operates on Open System Interconnection ('OSI') layers 4 to 7.
Router: a specialized network device that determines the next network point to which to forward a data packet toward its destination. Typically operates on OSI layer 3.
Bridge: a device that connects multiple network segments along the data link layer. Operates on OSI layer 2.
Switch: a device that allocates traffic from one network segment to certain lines or 'links'—intended destination or destinations which connect the segment to another network segment. Unlike a hub, a switch splits the network traffic and sends it to different destinations rather than to all systems on the network. Operates on OSI layer 2.
Multilayer Switch: a switch which, in addition to switching on OSI layer 2, provides functionality at higher protocol layers.
Hub: a device that connects multiple segments together and operates them as if they were a single segment. When using a hub, every attached device shares the same broadcast domain and the same collision domain. Therefore, only one computer connected to the hub is able to transmit at a time. Depending on the network topology, the hub provides a level 1 OSI model connection among the network objects (workstations, servers, etc). The hub may also provide bandwidth that is shared among all the objects, compared to switches, which provide a dedicated connection between individual nodes. Operates on OSI layer 1.
Repeater: a device that amplifies or regenerates digital signals received while setting the digital signals from one part of a network into another. Operates on OSI layer 1.
Protocol Converter: a hardware device that converts between two different types of transmissions, such as asynchronous and synchronous transmissions.
Bridge Router: a device that operates in a combination of router and bridge functionality. Operates on both OSI layer 2 and OSI layer 3.
Digital media receiver: a device that connects a computer network to a home theatre The switch (134) in the example of FIG. 1, couples the blade servers (108, including 152 and 128) for data communications with one another and with the router (130) and the VMMM (102). The switch (134), in concert with the virtual machine management module (102) as described below, operates for VM management in accordance with embodiments of the present invention. The virtual machine management module (102) ('VMMM') of FIG. 1 is a module of automated computing machinery comprising an aggregation of computer hardware and software that is configured to manage VMs among the networked servers (108 including 152 and 128) in the example of FIG. 1. The VMMM (102) in the example of FIG. 1 is executing a VM allocator, a module of computer program instructions that when executed causes the VMMM (102) to operate for VM management in accordance with embodiments of the present invention.

The switch (134) may monitor network traffic of applications (122-126) executing in virtual machines (114, 116, 118) of the servers (152, 128). Network traffic refers to data communications among servers that is supported by a network device, the switch (134) of FIG. 1. Network traffic may be quantified and monitored in various ways including, as one example, maintaining a count of a number of data communications packets originating from or transmitted to a particular application executing in a VM of a server. Here network traffic is monitored at the Open System Interconnection ('OSI') Layer 7—the application layer—rather than a lower level. In this way, identifiers of particular instances of applications may be associated with network traffic statistics—number of packets per application, and the like.

As explained below in greater detail with respect to FIG. 2, FIG. 8, and FIG. 9 either the network switch (134) or the VMMM (102)—via the VM allocator (110)—may then determine, in dependence upon the monitored network traffic (112), whether a particular application's (122-126) network traffic exceeds a predetermined threshold. If the particular application's (122-126) network traffic (112) exceeds the predetermined threshold the VM allocator (110) of the VMMM (102) may then allocate an additional virtual machine (114, 116, 118) in a different server (152, 128) and instantiate, by the VMMM (102), in the additional virtual machine (114, 116, 118) at least one application (122-126). The term 'allocate' is used here to indicate that a virtual machine is established and as such, resources of the underlying server are provided to, that is allocated to, the virtual machine in some fashion.

Consider, as an example of VM management carried out among the servers (108) of FIG. 1 that the monitored network traffic, as described by the application traffic statistics (112), of user-level application (122) executing within the virtual machine (114) of server (152), exceeds the predetermined threshold. In such an example, the VM allocator (110) of the VMMM (102) may allocate an additional VM, such as the VM (118) of server (128), and instantiate at least one application, such as user-level application (126), in the VM (118) of the server (128). As part of allocating the virtual machine, the VM allocator (110) of the VMMM (102) may also execute the hypervisor (142) if no hypervisor was previously executing and the VM allocator (110) may also boot load an operating system (154) prior to instantiating the user-level application (126). The user-level application (126) may be any of:

- another instance of the user-level application (122) that runs concurrently with the user-level application (122). In this example, user-level application (126) operates as a duplicate of the application (122) to distribute data communications amongst both the servers (152, 128) rather than just server (152);
- another instance of the user-level application (122) that does not run concurrently with the user-level application (122)—In this example, application (122) has been effectively 'moved' from server (152) to server (128), freeing bandwidth to other user-level applications (123-125) executing on server (152).
- an instance of another user-level application (123-125) executing on server (152). In this example, the other user-level application (123-125) may effectively be moved, or duplicated, on a different server so as to provide the other user-level application (123-125) with available bandwidth;
- others as will occur to readers of skill in the art.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
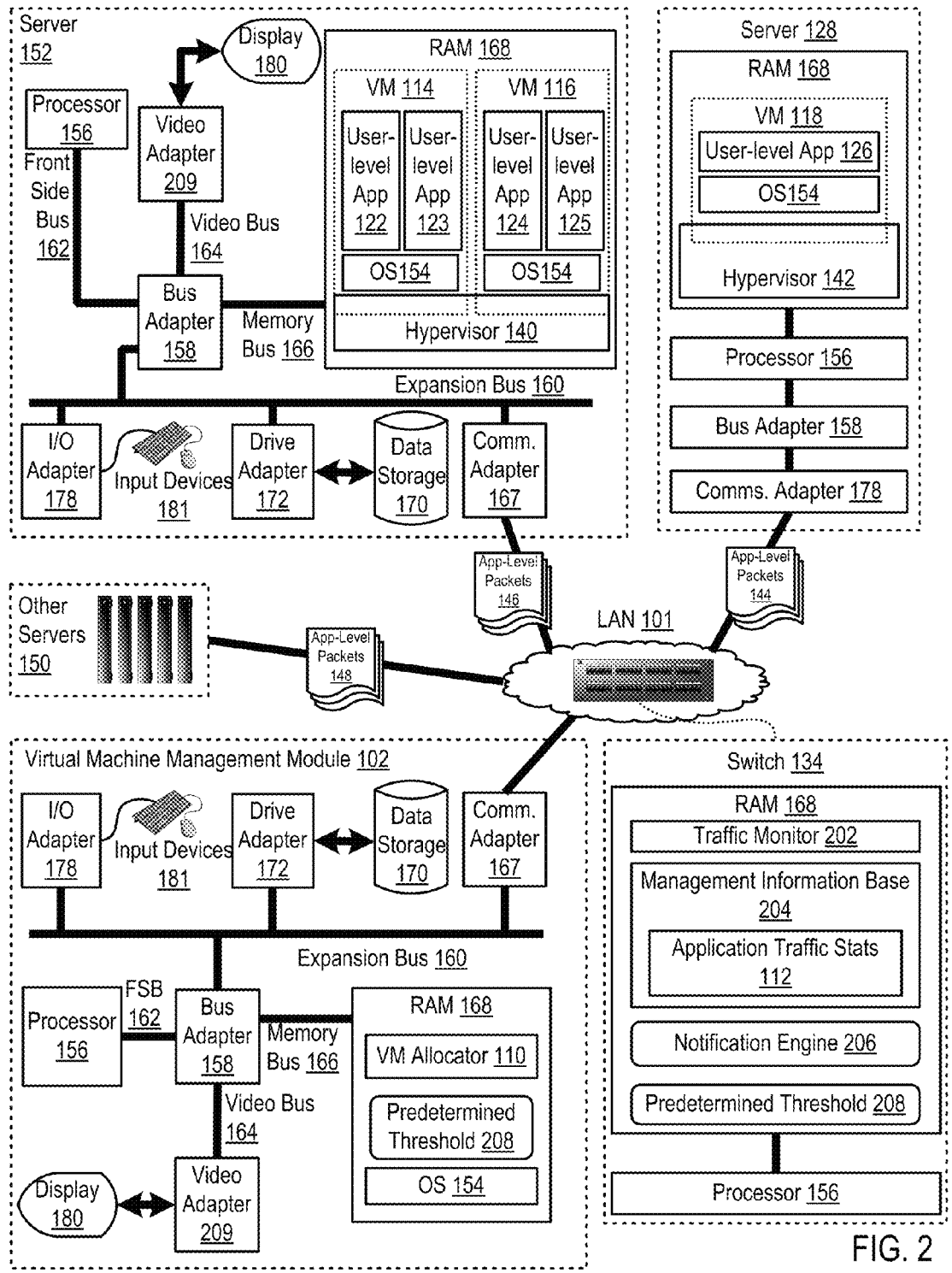
FIG. 2 sets forth a network diagram of an exemplary system for managing virtual machines among networked servers according to embodiments of the present invention.

FIG. 2 sets forth a network diagram of an exemplary system for managing virtual machines among networked servers according to embodiments of the present invention. The exemplary system of FIG. 2 is similar to the system depicted in the example of FIG. 1 in that the system of FIG. 2 also includes servers (152, 128), a network device in the form of a switch (134), and a VMMM (102), all of which are coupled or data communications with one another via a data communications network, a local area network ('LAN') (101). The servers (152, 128) and VMMM (102) are also coupled to other servers (150) for data communications.

In the system of FIG. 2, the servers (152, 128, and 150) are implemented as computers that include similar components—processor (156), RAM (168), bus adapter (158), communications adapter (178), and the like—as the servers depicted in, and described with respect to, FIG. 1. The switch (134), in the example of FIG. 2, is also implemented as a type of computer, that is, automated computing machinery, similar to the servers (152, and 128). The switch (134) includes a processor (156) coupled to RAM (168). The switch, of course, may include more components, software and hardware, but for clarity of explanation is depicted in the example of FIG. 2 with only RAM and a processor. Stored in RAM (168) of the switch (134) is a traffic monitor (202). A traffic monitor (202) is a module of computer program instructions that when executed cause the network switch (134) to monitor network traffic (144, 146, 148) of applications (122-126) executing in virtual machines (114, 116, 128) of the servers (150, 152, 128). The example traffic monitor (202) stores application traffic statistics (112) in a management information base ('MIB') (204). Application traffic statistics (112) are information describing applications' data communication traffic—data communications to and from an application. In the system of FIG. 2, the switch (134) executes a notification engine (206) along with the traffic monitor (202). The notification engine (206) is a module of computer program instructions that when executed operates the switch (134) to perform determine whether a particular application's network traffic exceeds a predetermined threshold and notifying the VMMM (102) if the application's network traffic does exceed the predetermined threshold (208).

An MIB is a virtual database used for managing the entities in a communications network. The database is hierarchical (tree-structured) and entries are addressed through object identifiers. Internet documentation Request For Comments ('RFCs') discuss MIBs, notably RFC 1155, "Structure and Identification of Management Information for TCP/IP based internets," and its two companions, RFC 1213, "Management Information Base for Network Management of TCP/IP-based internets," and RFC 1157, "A Simple Network Management Protocol." In this example, the MIB also stores application traffic statistics describing applications' data communication traffic.

In addition to the switch (134), and as mentioned above with respect to FIG. 1, the VMMM (102) may also be implemented as automated computing machinery—that is, as a computer. For further explanation, therefore, FIG. 2 sets forth an example VMMM (102) implemented as a computer. The example VMMM (102) of FIG. 2 includes components similar to those of the servers (152, 128): a processor (156), a bus adapter (158), a communications adapter (178), RAM (168), and so on. Stored in RAM (168) of the VMMM (102) is a virtual machine allocator (110). The VM allocator (110) is a module of computer program instructions that when executed manages virtual machines among networked servers in accordance with embodiments of the present invention. As an alternative to the notification engine (206) of the switch, the VM allocator (110) of the VMMM (102) may also be configured to determine whether a particular application's (122-126) network traffic exceeds a predetermined threshold (208). That is, either of the switch (134) or the VMMM (102) may determine whether an application's network traffic exceeds a threshold. In this way, the hypervisors (140, 142) supporting the virtual machines (114, 116, 118) in which the applications (122-126) execute, need not dedicate processing overhead to monitoring the data communications and determining whether an application's network traffic exceeds a threshold. Such an embodiment would decrease resources available to the application during the time the hypervisor is monitoring network traffic and determining whether the network traffic exceeds a threshold.

In the system of FIG. 2, if the particular application's (122-126) network traffic (146, 148, 144) exceeds the predetermined threshold (208) the VM allocator (110) of the VMMM (102) allocates an additional virtual machine (114, 116, 118) in a different server (152, 128) and instantiates in the additional virtual machine (114, 116, 118) at least one application.

The arrangement of servers and other devices making up the exemplary system illustrated in FIG. 2 are for explanation, not for limitation. Data processing systems useful according to various embodiments of the present invention may include additional servers, routers, other devices, and peer-to-peer architectures, not shown in FIG. 2, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 2.

Figure 3:
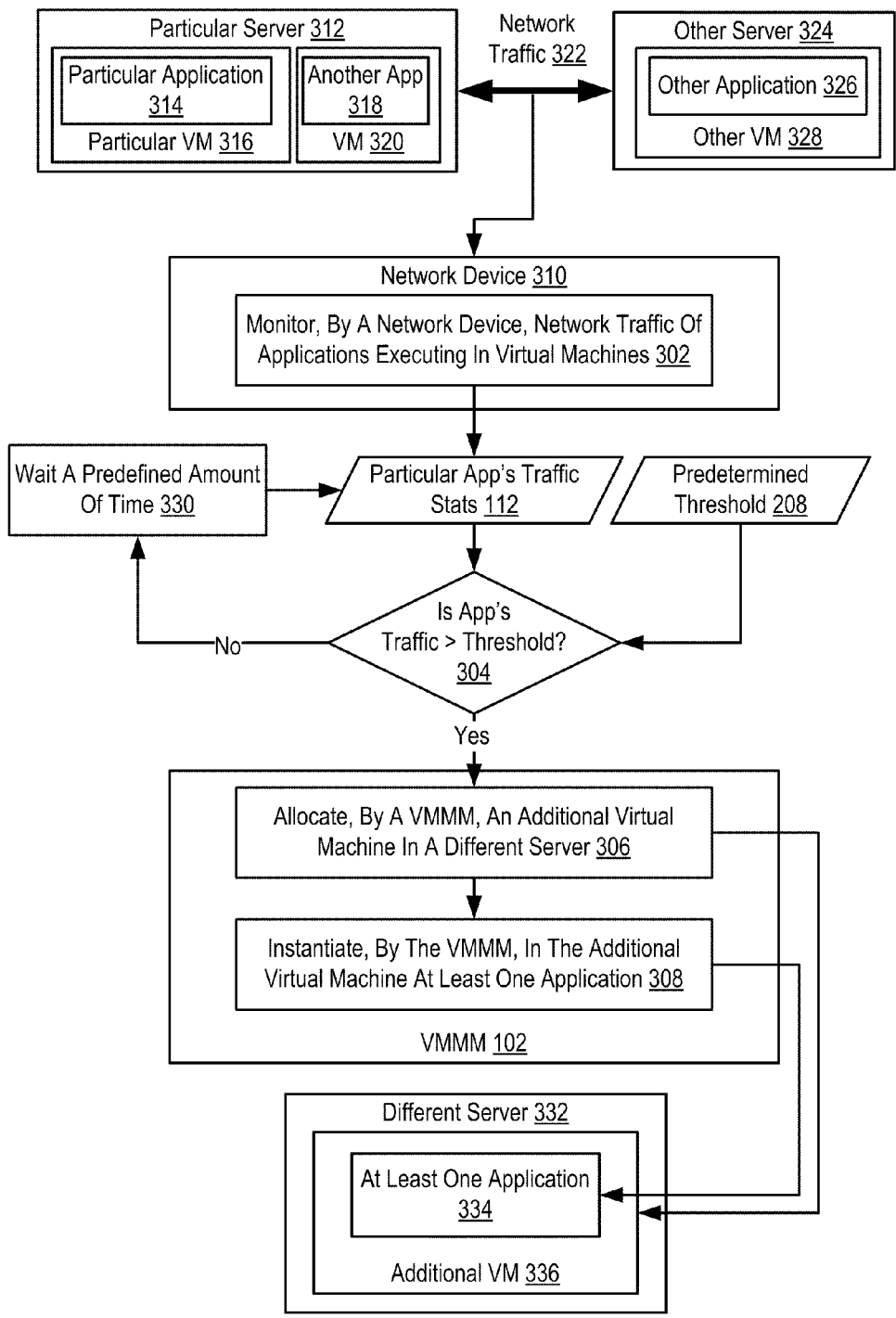
FIG. 3 sets forth a flow chart illustrating an exemplary method for virtual machine management among networked servers according to embodiments of the present invention.

For further explanation, FIG. 3 sets forth a flow chart illustrating an exemplary method for virtual machine management among networked servers according to embodiments of the present invention. In the method of FIG. 3, the servers (312, 324, 332) are coupled for data communications (322) with a data communications network that includes a network device (310) and a VMMM (102).

The method of FIG. 3 includes monitoring (302), by the network device (310), network traffic (322) of applications (314, 318, 326) executing in virtual machines (316, 320) of the servers (312, 324). Monitoring (302), by the network device (310), network traffic (322) of applications (314, 318, 326) executing in virtual machines (316, 320) of the servers (312, 324) may be carried out by maintaining a count of data communications packets from and to (or any combination thereof) a particular application.

The method of FIG. 3 also includes determining (304), in dependence upon the monitored network traffic (322), whether a particular application's (314) network traffic (112) exceeds a predetermined threshold (208). Determining (304) whether a particular application's (314) network traffic (112) exceeds a predetermined threshold (208) may be carried out, periodically for each currently executing application, by comparing the number of packets received from and sent to that application since the last determination was made to the predetermined threshold. In the method of FIG. 3, the particular application (314) executes in a particular virtual machine (316) of a particular server (312). The term 'particular' here is used only for ease of explanation in identifying the application presently at issue, the virtual machine within which the application at issue executes and the server upon which the virtual machine within which the application at issue executes runs.

If the particular application's (314) network traffic (112) does not exceed the predetermined threshold (208), the method of FIG. 3 continues by waiting (330) a predefined amount of time before again determining (304) whether the particular application's (314) network traffic (112) exceeds the predetermined threshold (208). That is, the switch (134) or VMMM (102), whichever is configured to carry out the determination step (304), may be configured to periodically determine whether an applications' traffic is greater than the predetermined threshold.

If the particular application's (314) network traffic (112) exceeds the predetermined threshold (208), the method of FIG. 3 continues by allocating (306), by the VMMM (102), an additional virtual machine (336) in a different server (332). Allocating (306), by the VMMM (102), an additional virtual machine (336) in a different server (332) may be carried out by staring a hypervisor in the different server (332), providing to the hypervisor a virtual machine configuration specifying various attributes, such as CPU type, available memory, I/O devices, and other hardware resources, instructing the hypervisor to start the virtual machine, and loading, as part of the VM's startup, an operating system.

The method of FIG. 3 also includes instantiating (308), by the VMMM (102), in the additional virtual machine (336) at least one application (334). Instantiating (308) at least one application (334) in the additional virtual machine (336) may be carried out by identifying the application, locating an executable in a repository of executables, a directory structure of the particular server, and the like, supplying the executable file to the different server (332), and executing the executable file in the additional VM (336).

Figure 4:
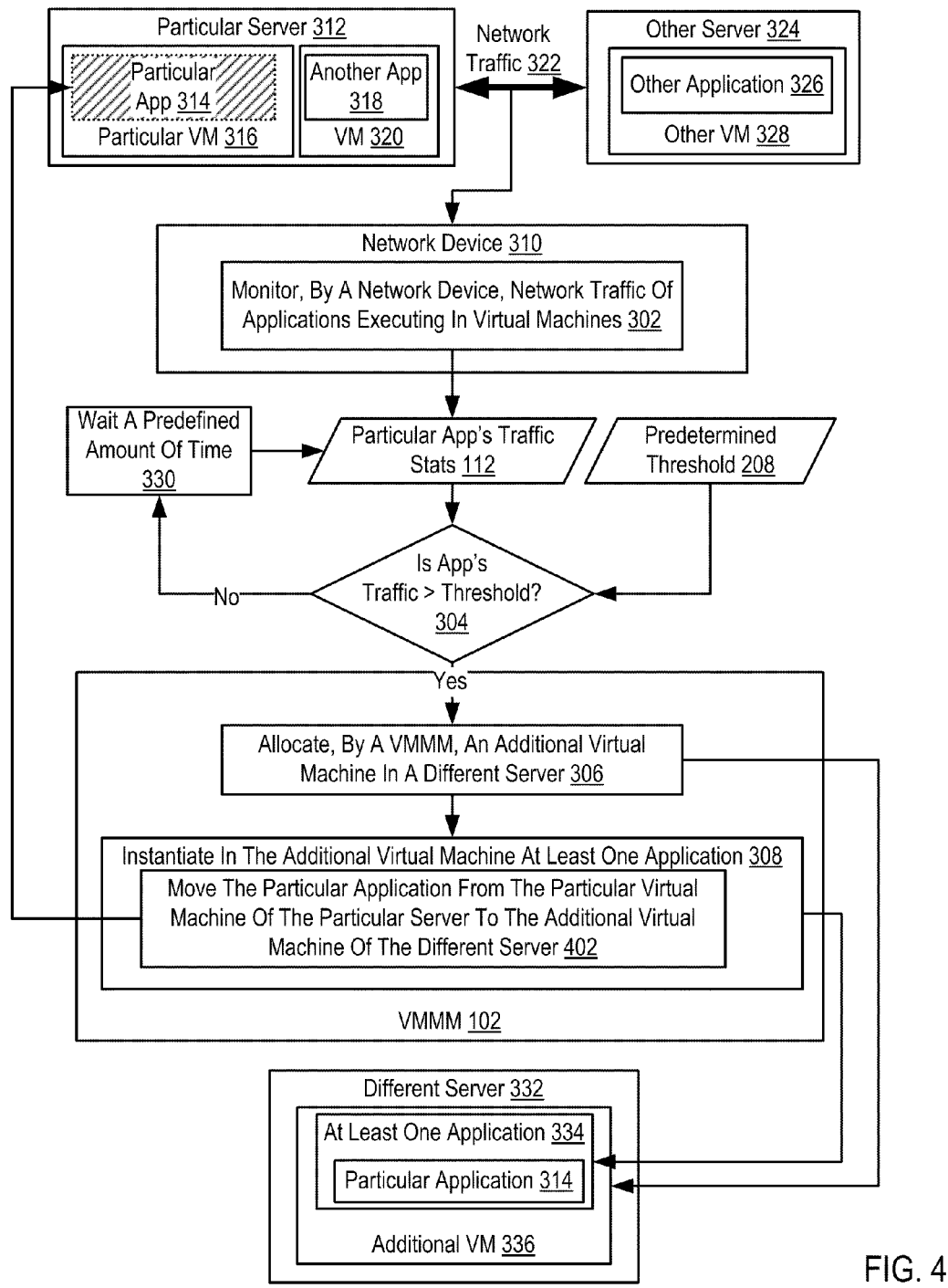
FIG. 4 sets forth a flow chart illustrating a further exemplary method for virtual machine management among networked servers according to embodiments of the present invention.

For further explanation, FIG. 4 sets forth a flow chart illustrating a further exemplary method for virtual machine management among networked servers according to embodiments of the present invention. The method of FIG. 4 is similar to the method of FIG. 3 in that in the method of FIG. 4 the servers (312, 324, 332) are coupled for data communications (322) with a data communications network that includes a network device (310) and a VMMM (102). The method of FIG. 4 is also similar to the method of FIG. 3 in that the method of FIG. 4 includes monitoring (302), network traffic (322) of applications (314, 318, 326); determining (304) whether a particular application's (314) network traffic (112) exceeds a predetermined threshold (208); allocating (306) an additional virtual machine (336) in a different server (332) if the particular application's (314) network traffic (112) exceeds the predetermined threshold (208); and instantiating (308) at least one application (334) in the additional virtual machine (336).

The method of FIG. 4 differs from the method of FIG. 3, however, in that, in the method of FIG. 4, instantiating (308) at least one application (334) in the additional virtual machine (336) is carried out by moving (402) the particular application (314) from the particular virtual machine (316) of the particular server (312) to the additional virtual machine (336) of the different server (332). Moving (402) the particular application (314) may be carried out in various ways, including, for example by providing to the additional virtual machine (336) a copy of an executable file of the particular application (314), executing the copy of the executable file, and stopping execution of the particular application (314) on the particular server. The term 'moving' is used here to describe an effect or an outcome rather than the means by which an application is moved. That is, movement of an application describes two states of an application, a first state in which an application is executing on a particular server, and a final state in which the application is no longer executing on that particular server but is instead executing on another server. From the first state to the second state, therefore, one may describe the application as having been 'moved' from the particular server to the other server. The means by which such a 'movement' of an application is carried out, however, may vary greatly within the scope of the present invention. In the method of FIG. 4, the particular application (314) is moved form the particular server (312) to the different server (312) to reduce the data communications received by or sent from the particular server (312). That is, another application (318) executing in another virtual machine (320) or even the same particular VM (316) as the particular application (314) may have little to no available bandwidth (due to the particular application's massive bandwidth usage) before the movement of the particular application (314), but after the movement, the application (318) may have more available bandwidth due to the reduction in the particular application's massive bandwidth usage.

Figure 5:
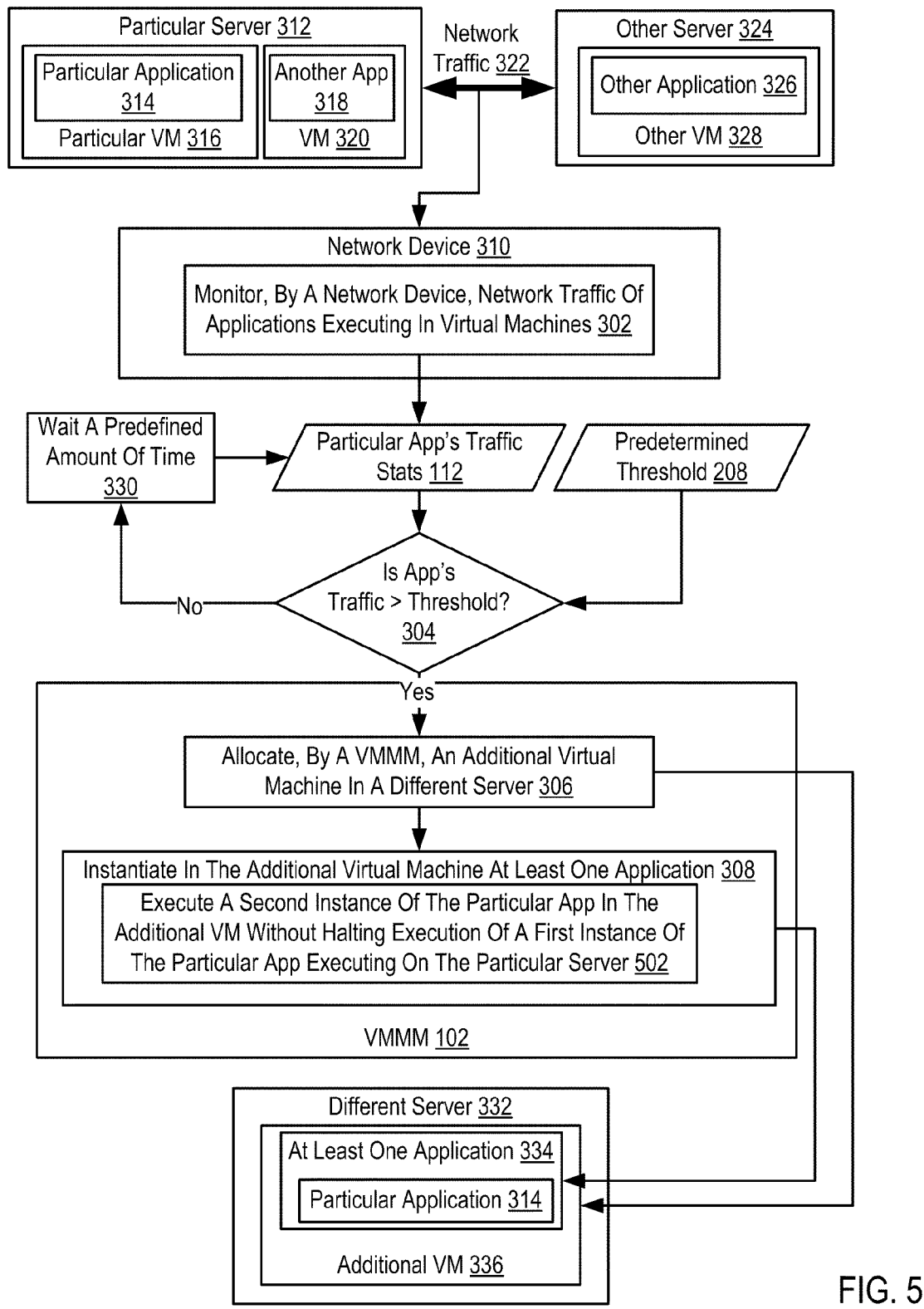
FIG. 5 sets forth a flow chart illustrating a further exemplary method for virtual machine management among networked servers according to embodiments of the present invention.

For further explanation, FIG. 5 sets forth a flow chart illustrating a further exemplary method for virtual machine management among networked servers according to embodiments of the present invention. The method of FIG. 5 is similar to the method of FIG. 3 in that in the method of FIG.

5 the servers (312, 324, 332) are coupled for data communications (322) with a data communications network that includes a network device (310) and a VMMM (102). The method of FIG. 5 is also similar to the method of FIG. 3 in that the method of FIG. 5 includes monitoring (302), network traffic (322) of applications (314, 318, 326); determining (304) whether a particular application's (314) network traffic (112) exceeds a predetermined threshold (208); allocating (306) an additional virtual machine (336) in a different server (332) if the particular application's (314) network traffic (112) exceeds the predetermined threshold (208); and instantiating (308) at least one application (334) in the additional virtual machine (336).

The method of FIG. 5 differs from the method of FIG. 3, however, in that, in the method of FIG. 5, instantiating (308) at least one application (334) in the additional virtual machine (336) is carried out by executing (502) a second instance of the particular application (314) in the additional virtual machine (336) of the different server (332) without halting execution of a first instance of the particular application (314) executing on the particular server (312). That is, in the method of FIG. 5, the VMMM (102) executes another instance of the same application (314) thereby distributing data communications (the applications' network traffic) among both instances of the application. Consider, for example, that the particular application (314) is a printer server, receiving a great number of print requests. To reduce the data communications received by the particular server (312) directed to the printer server, the VMMM (102) may execute another instance of the printer server on a different server (332) such that print requests may be distributed among both the particular server (312) and the different server (332).

Figure 6:
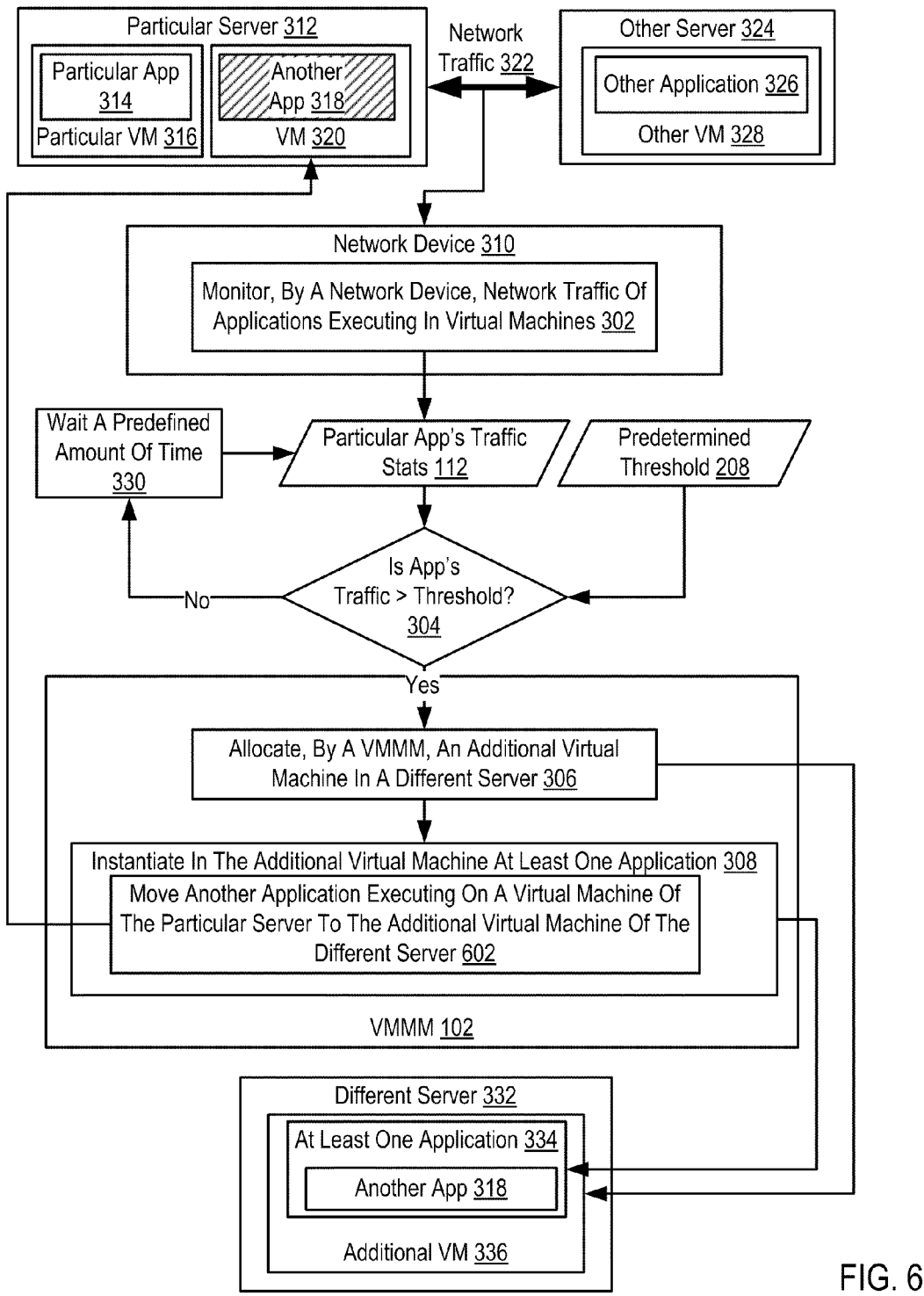
FIG. 6 sets forth a flow chart illustrating a further exemplary method for virtual machine management among networked servers according to embodiments of the present invention.

For further explanation, FIG. 6 sets forth a flow chart illustrating a further exemplary method for virtual machine management among networked servers according to embodiments of the present invention. The method of FIG. 6 is similar to the method of FIG. 3 in that in the method of FIG. 6 the servers (312, 324, 332) are coupled for data communications (322) with a data communications network that includes a network device (310) and a VMMM (102). The method of FIG. 6 is also similar to the method of FIG. 3 in that the method of FIG. 6 includes monitoring (302), network traffic (322) of applications (314, 318, 326); determining (304) whether a particular application's (314) network traffic (112) exceeds a predetermined threshold (208); allocating (306) an additional virtual machine (336) in a different server (332) if the particular application's (314) network traffic (112) exceeds the predetermined threshold (208); and instantiating (308) at least one application (334) in the additional virtual machine (336).

The method of FIG. 6 differs from the method of FIG. 3, however, in that, in the method of FIG. 6, instantiating (308) at least one application (334) in the additional virtual machine (336) is carried out by moving (602) another application (318) executing on a virtual machine (320) of the particular server (320) to the additional virtual machine (336) of the different server (332). In this way, applications other than the particular application executing on the same server as the particular application monopolizing available bandwidth of the server, may be moved to another server thereby providing the other application access to bandwidth resources. Although the application (318) moved from the particular server (312) to the different server (332) in the example of FIG. 6, is depicted as executing in a different VM (320) than the particular application (314), such is not a limitation. Instead, any application executing on the same server (312) as the particular application (314) may be moved to the different server (332) in accordance with embodiments of the present invention regardless of the VM of the server (312) in which the application is executing.

Figure 7:
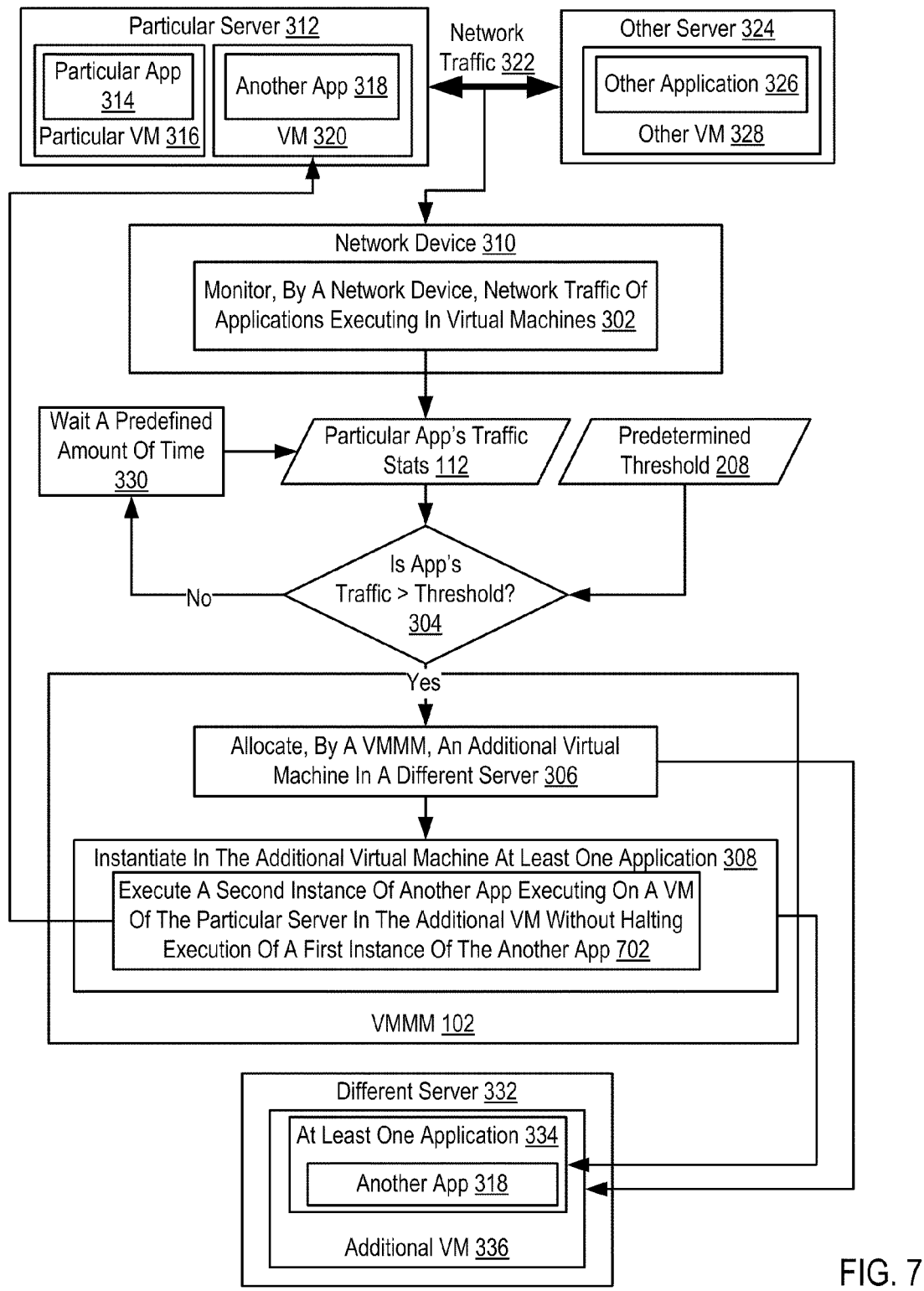
FIG. 7 sets forth a flow chart illustrating a further exemplary method for virtual machine management among networked servers according to embodiments of the present invention.

For further explanation, FIG. 7 sets forth a flow chart illustrating a further exemplary method for virtual machine management among networked servers according to embodiments of the present invention. The method of FIG. 7 is similar to the method of FIG. 3 in that in the method of FIG. 7 the servers (312, 324, 332) are coupled for data communications (322) with a data communications network that includes a network device (310) and a VMMM (102). The method of FIG. 7 is also similar to the method of FIG. 3 in that the method of FIG. 7 includes monitoring (302), network traffic (322) of applications (314, 318, 326); determining (304) whether a particular application's (314) network traffic (112) exceeds a predetermined threshold (208); allocating (306) an additional virtual machine (336) in a different server (332) if the particular application's (314) network traffic (112) exceeds the predetermined threshold (208); and instantiating (308) at least one application (334) in the additional virtual machine (336).

The method of FIG. 7 differs from the method of FIG. 3, however, in that, in the method of FIG. 7, instantiating (308) at least one application (334) in the additional virtual machine (336) is carried out by executing (702) a second instance of another application (318) executing on a virtual machine of the particular server in the additional virtual machine of the different server without halting execution of a first instance of the another application on the particular server. Here, the "another application" (318) executing on the same server (312) of the particular application (314), is effectively duplicated and executes on a different server (332). In this way, data communications to and from the "another application" (318) may be distributed among the two servers (312, 332) and the network traffic to and from the particular application (314) will affect the network traffic of the "another application" (318) less than if only one instance of the "another application" (318) were executing on a server, especially if that server is the same server (312) upon which the particular application (314) is executing.

Figure 8:
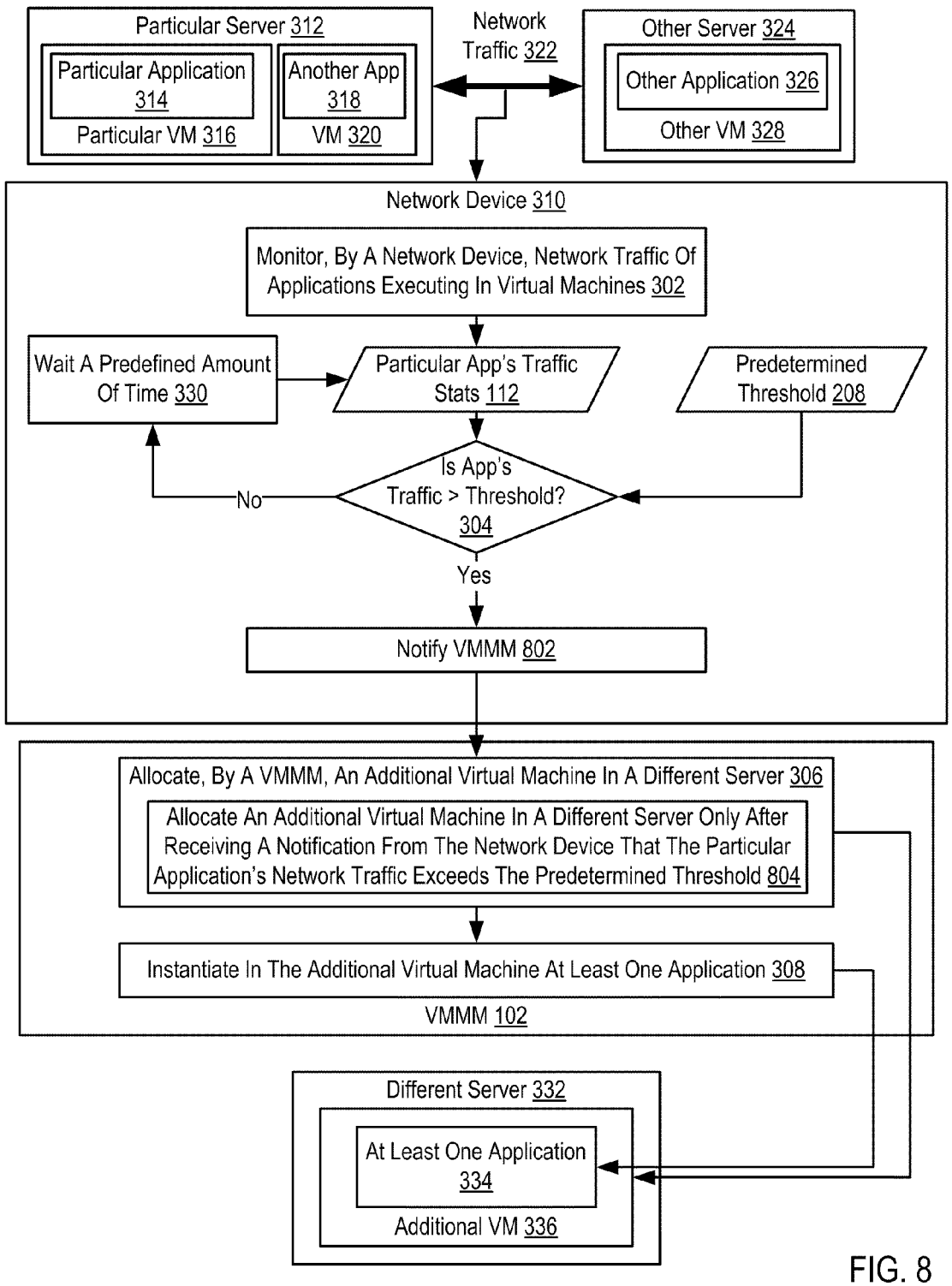
FIG. 8 sets forth a flow chart illustrating a further exemplary method for virtual machine management among networked servers according to embodiments of the present invention.

For further explanation, FIG. 8 sets forth a flow chart illustrating a further exemplary method for virtual machine management among networked servers according to embodiments of the present invention. The method of FIG. 8 is similar to the method of FIG. 3 in that in the method of FIG. 8 the servers (312, 324, 332) are coupled for data communications (322) with a data communications network that includes a network device (310) and a VMMM (102). The method of FIG. 8 is also similar to the method of FIG. 3 in that the method of FIG. 8 includes monitoring (302), network traffic (322) of applications (314, 318, 326); determining (304) whether a particular application's (314) network traffic (112) exceeds a predetermined threshold (208); allocating (306) an additional virtual machine (336) in a different server (332) if the particular application's (314) network traffic (112) exceeds the predetermined threshold (208); and instantiating (308) at least one application (334) in the additional virtual machine (336).

The method of FIG. 8 differs from the method of FIG. 3, however, in that, in the method of FIG. 8, determining (304) whether a particular application's (314) network traffic (112) exceeds a predetermined threshold (208) is carried out by the network device (310) rather than the VMMM (102). The method of FIG. 8 also includes notifying, by the network device (310), the VMMM (102) that the particular application's (314) network traffic (322) as expressed in the particular application's traffic statistics, is greater than the predetermined threshold.

In the method of FIG. 8, allocating (306) an additional virtual machine (336) in a different server (332) if the particular application's (314) network traffic (112) exceeds the predetermined threshold (208) is carried out by allocating (804) the additional virtual machine only after receiving, by the VMMM (102), a notification from the network device that the particular application's network traffic exceeds the predetermined threshold.

Figure 9:
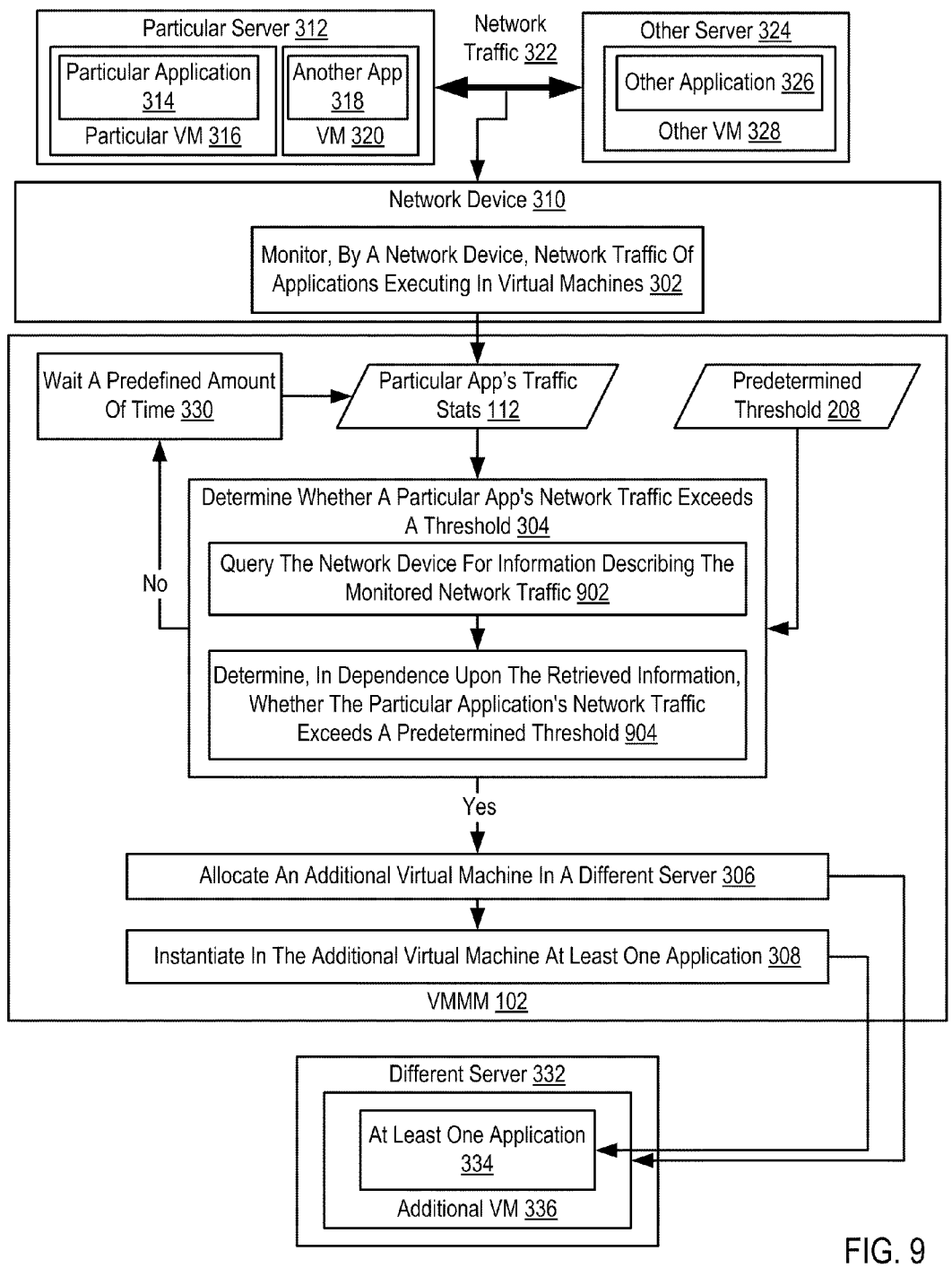
FIG. 9 sets forth a flow chart illustrating a further exemplary method for virtual machine management among networked servers according to embodiments of the present invention.

For further explanation, FIG. 9 sets forth a flow chart illustrating a further exemplary method for virtual machine management among networked servers according to embodiments of the present invention. The method of FIG. 9 is similar to the method of FIG. 3 in that in the method of FIG. 9 the servers (312, 324, 332) are coupled for data communications (322) with a data communications network that includes a network device (310) and a VMMM (102). The method of FIG. 9 is also similar to the method of FIG. 3 in that the method of FIG. 9 includes monitoring (302), network traffic (322) of applications (314, 318, 326); determining (304) whether a particular application's (314) network traffic (112) exceeds a predetermined threshold (208); allocating (306) an additional virtual machine (336) in a different server (332) if the particular application's (314) network traffic (112) exceeds the predetermined threshold (208); and instantiating (308) at least one application (334) in the additional virtual machine (336).

The method of FIG. 9 differs from the method of FIG. 3, however, in that, in the method of FIG. 9, determining (304) whether a particular application's (314) network traffic (112) exceeds a predetermined threshold (208) is carried out by querying (902) the network device (310) by the VMMM (102) for information describing the monitored network traffic and determining (904), by the VMMM (102) in dependence upon the retrieved information (112), whether the particular application's network traffic exceeds a predetermined threshold (208). FIG. 9 sets forth an alternative way of carrying out the determination (304) step with regard to the method of FIG. 8. In FIG. 9, the VMMM (102) makes the determination (304), while in FIG. 8 the network device (310) carries out the determination.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. An apparatus for virtual machine management among networked servers, the servers coupled for data communications with a data communications network that includes a network switch and a Virtual Machine Management Module ('VMMM'), the apparatus comprising a computer processor, a computer memory operatively coupled to the computer processor, the computer memory having disposed within it computer program instructions capable of:
monitoring, by the network switch, network traffic of a first user-level application including monitoring bandwidth used by the first user-level application, wherein the first user-level application is one of a plurality of user-level applications executing in virtual machines of the servers, wherein the network switch is separate from the servers and coupled to the servers via the data communications network, and wherein the network traffic is monitored by the network switch at an application layer;
determining, by the network switch, in dependence upon the monitored network traffic, whether the first user-level application's network traffic exceeds a predetermined threshold, the first user-level application executing in a particular virtual machine of a particular server, wherein the first user-level application exceeding the predetermined threshold indicates that a second user-level application on the particular server has insufficient bandwidth;
if the first user-level application's network traffic exceeds the predetermined threshold, allocating, by the VMMM, an additional virtual machine in a different server including allocating the additional virtual machine only after receiving, by the VMMM via the data communications network, a notification from the network switch that the first user-level application's network traffic exceeds the predetermined threshold; and
instantiating, by the VMMM, in the additional virtual machine at least one user-level application, wherein instantiating at least one user-level application comprises:
moving the first user-level application from the particular virtual machine of the particular server to the additional virtual machine of the different server; and
providing the second user-level application with sufficient bandwidth in response to moving the first user-level application.

2. The apparatus of claim 1 wherein, instantiating at least one user-level application further comprises executing a second instance of the first user-level application in the additional virtual machine of the different server without halting execution of a first instance of the first user-level application executing on the particular server.

3. The apparatus of claim 1 wherein, instantiating at least one user-level application further comprises moving another user-level application executing on a virtual machine of the particular server to the additional virtual machine of the different server.

4. The apparatus of claim 1 wherein, instantiating at least one user-level application further comprises executing a second instance of another user-level application executing on a virtual machine of the particular server in the additional virtual machine of the different server without halting execution of a first instance of the another user-level application on the particular server.

5. The apparatus of claim 1 wherein determining whether a first user-level application's network traffic exceeds a predetermined threshold further comprises:
querying the network switch by the VMMM for information describing the monitored network traffic; and
determining, by the VMMM in dependence upon the retrieved information, whether the first user-level application's network traffic exceeds a predetermined threshold.

6. A computer program product for virtual machine management among networked servers, the servers coupled for data communications with a data communications network that includes a network switch and a Virtual Machine Management Module ('VMMM'), the computer program product disposed upon a computer readable storage medium, wherein the medium is not a signal, the computer program product comprising computer program instructions capable, when executed, of causing a computer to carry out the steps of:
monitoring, by the network switch, network traffic of a first user-level application including monitoring bandwidth used by the first user-level application, wherein the first user-level application is one of a plurality of user-level applications executing in virtual machines of the servers, wherein the network switch is separate from the servers and coupled to the servers via the data communications network, and wherein the network traffic is monitored by the network switch at an application layer;
determining, by the network switch, in dependence upon the monitored network traffic, whether the first user-level application's network traffic exceeds a predetermined threshold, the first user-level application executing in a particular virtual machine of a particular server, wherein the first user-level application exceeding the predetermined threshold indicates that a second user-level application on the particular server has insufficient bandwidth;
if the first user-level application's network traffic exceeds the predetermined threshold, allocating, by the VMMM, an additional virtual machine in a different server including allocating the additional virtual machine only after receiving, by the VMMM via the data communications network, a notification from the network switch that the first user-level application's network traffic exceeds the predetermined threshold; and instantiating, by the VMMM, in the additional virtual machine at least one user-level application, instantiating, by the VMMM, in the additional virtual machine at least one user-level application, wherein instantiating at least one user-level application comprises:

moving the first user-level application from the particular virtual machine of the particular server to the additional virtual machine of the different server; and providing the second user-level application with sufficient bandwidth in response to moving the first user-level application.

7. The computer program product of claim 6 wherein, instantiating at least one user-level application further comprises executing a second instance of the first user-level application in the additional virtual machine of the different server without halting execution of a first instance of the first user-level application executing on the particular server.

8. The computer program product of claim 6 wherein, instantiating at least one user-level application further comprises moving another user-level application executing on a virtual machine of the particular server to the additional virtual machine of the different server.

9. The computer program product of claim 6 wherein, instantiating at least one user-level application further comprises executing a second instance of another user-level application executing on a virtual machine of the particular server in the additional virtual machine of the different server without halting execution of a first instance of the another user-level application on the particular server.

10. The computer program product of claim 6 wherein determining whether a first user-level application's network traffic exceeds a predetermined threshold further comprises:

querying the network switch by the VMMM for information describing the monitored network traffic; and determining, by the VMMM in dependence upon the retrieved information, whether the first user-level application's network traffic exceeds a predetermined threshold.

11. An apparatus for virtual machine management among networked servers, the servers coupled for data communications with a data communications network that includes a network switch and a Virtual Machine Management Module ('VMMM'), the apparatus comprising a computer processor, a computer memory operatively coupled to the computer processor, the computer memory having disposed within it computer program instructions capable of:

monitoring network traffic by the network switch including:

monitoring bandwidth used by a first user-level application, wherein the first user-level application is one of a plurality of applications executing in virtual machines of the servers, monitoring bandwidth used by a second user-level application, wherein the second user-level application is one of the plurality of user-level applications executing in the virtual machines of the servers, wherein the network switch is separate from the servers and coupled to the servers via the data communications network, and wherein the network traffic is monitored by the network switch at an application layer;

determining, by the network switch, in dependence upon the monitored network traffic, that the first user-level application's network traffic exceeds a predetermined threshold, the first user-level application executing in a particular virtual machine of a particular server, wherein the first user-level application exceeding the predetermined threshold indicates that the second user-level application on the particular server has insufficient bandwidth;

notifying, by the network switch, the VMMM that the first user-level application's network traffic exceeds the predetermined threshold;

in response to the notification that first user-level application's network traffic exceeds the predetermined threshold, allocating, by the VMMM, an additional virtual machine in a different server including allocating the additional virtual machine only after receiving, by the VMMM via the data communications network, a notification from the network switch that the first user-level application's network traffic exceeds the predetermined threshold; and instantiating, by the VMMM, in the additional virtual machine at least one application, wherein instantiating the at least one application further comprises:

moving the particular first user-level application from the particular virtual machine of the particular server to the additional virtual machine of the different server; and providing the second user-level application with sufficient bandwidth in response to moving the first user-level application.

* * * * *